J. G. MACLAREN.
COUPLING FOR PNEUMATIC DESPATCH TUBES.
APPLICATION FILED NOV. 14, 1914.
1,302,944.
Patented May 6, 1919.
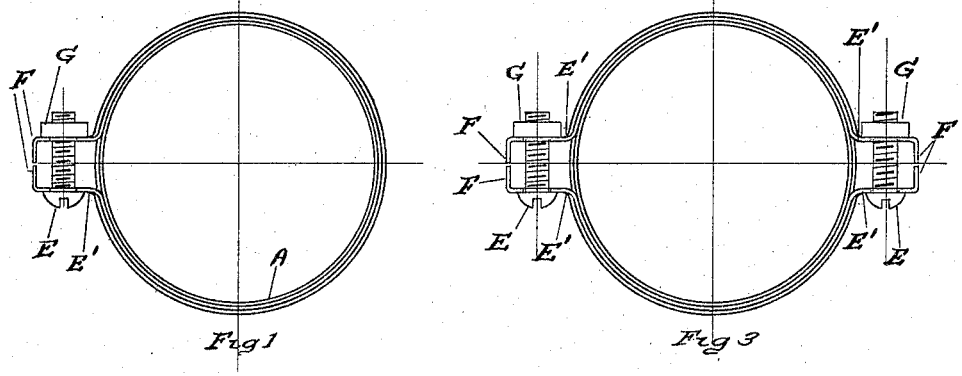
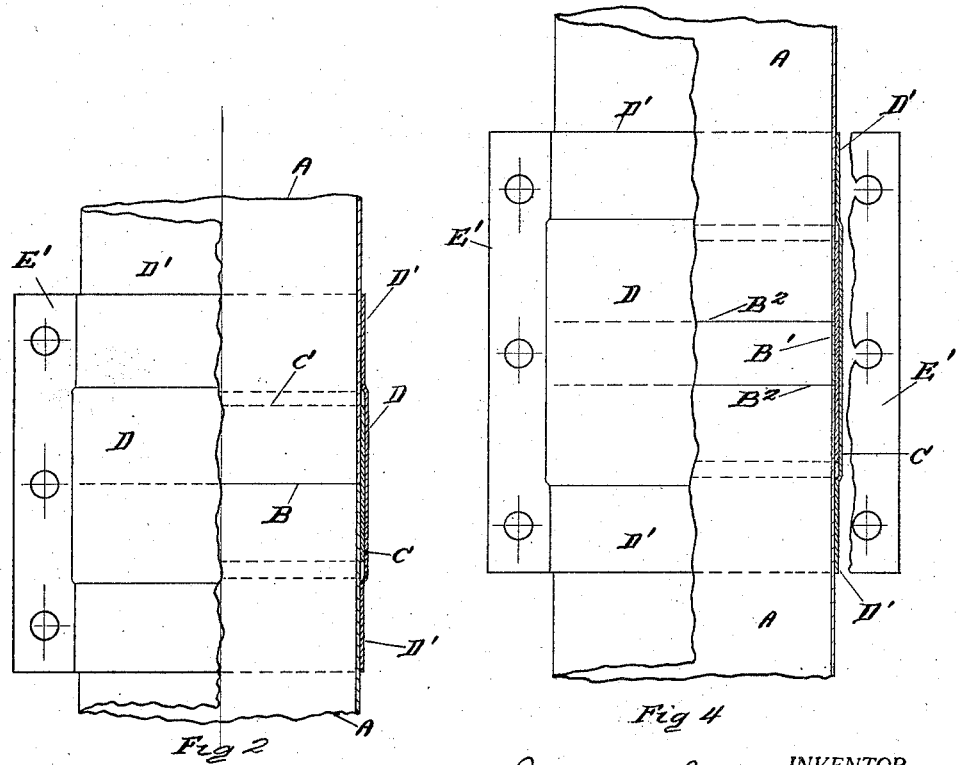
WITNESSES:
INVENTOR.
BY
ATTORNEYS.

UNITED STATES PATENT OFFICE.

JAMES G. MACLAREN, OF HARRISON, NEW YORK.

COUPLING FOR PNEUMATIC-DESPATCH TUBES.

1,302,944.  Specification of Letters Patent.  Patented May 6, 1919.

Application filed November 14, 1914. Serial No. 872,236.

*To all whom it may concern:*

Be it known that I, JAMES G. MACLAREN, of Harrison, in the county of Westchester and State of New York, have invented certain new and useful Improvements in Couplings for Pneumatic-Despatch Tubes, of which the following is a specification.

My invention relates to certain new and useful improvements in couplings for pneumatic despatch tubes commonly in use for store service and other uses where the transportation of cash memo or parcels are transmitted between stations.

The object of my invention is to produce a coupling for the joints of pneumatic tubes which is simple in construction, capable of easy manipulation to separate the tubes and efficient when the joints are secured together to prevent the escape of air from the tubes.

My invention consists of certain novel features hereinafter described and particularly pointed out in the claims.

In the installation of pneumatic despatch tubes the sections of the tubes are easily coupled together by a slip sleeve, but as it is frequently necessary to separate the tubes, owing to the carriers sticking in the tubes or for other reasons, the coupling cannot be readily manipulated by sliding the sleeve over the joint owing to paint or the lacquer finish on the tubes, so that it is the object of my invention to produce an improved coupling device for coupling the sections of the tubes together, which will produce not only air tight joints, but is easily and quickly removable so that the tube may be opened at any joint throughout the line to remove carriers which may have stuck in the tube, particularly at the curves where because of some irregularity in the carrier it may at times become stuck or for other reasons which may arise where it is necessary to separate the sections of the tube.

In the accompanying drawings which illustrate a construction embodying my invention:

Figure 1 is an end elevation of the coupling joining two sections of the tube.

Fig. 2 is a top plan view partly in section showing two sections of the tube abutting with the coupling in position over the abutting joint.

Fig. 3 is a similar view to Fig. 1 excepting that the coupling is clamped together in two places, that is, on opposite sides of the sections of the tube.

Fig. 4 is a top plan view partly in section showing two sections of the tube abutting against a short section placed between the ends of the tube sections and the coupling in position over the adjacent sections of the tube, and also showing the means for tensioning the clamp on opposite sides of the connected tube.

Like letters of reference refer to like parts throughout the several views.

Referring to Fig. 2, two sections of the pneumatic tube A are alined with each other and may abut as there shown and they are joined by a splicing sleeve or union C which may take the form of a short section of tube slightly larger than the tubing A so that it may slide easily over the opposed ends, but will join them and hold them accurately in alinement.

To secure the splicing sleeve C in position, a clamping member D is utilized. This clamping member D is conveniently made of sheet metal and is provided with suitable means such as the flanges E', bolts E and nuts G shown in Fig. 1 for tensioning about the pneumatic tube. The clamp is longer than the union C and the portion of its inner surface between its ends is inset to receive the same. This may conveniently be done by embossing a portion of the sheet metal clamp as shown in the drawings thus providing a recess to receive the union C and terminal flanges D' which embrace the tube section A and clamp the same.

In Fig. 3 I have shown the clamp as made in two parts each substantially semi-cylindrical and joined at either side by bolts E and nuts G.

In Fig. 4 I have shown two alined sections of pneumatic tube A A slightly spaced apart and a section of tube B' of like size interposed between the sections and in contact therewith so that a smooth inner surface is provided through the joined tube sections. The splicing sleeve C is of sufficient length to extend over the section B' and lap upon the ends of the tube sections A and is secured in place by a clamp D in all respects similar to that already described.

In the drawings I have shown the outer edges of the flanges E' bent at right angles at F so that when the two parts are drawn together they form a rim along the side of the clamp with a closed surface.

It will be understood that the band C may be split or made in two pieces instead of one continuous band.

It will be understood that the cover D' may be straight without the recessed portion D and filling pieces may be used to make up the space between the band C and the ends of the cover D'.

It is desirable, especially in tubes of the larger sizes that the coupling may be made up on the end of one section of transit tube and the coupling left in such a position that when another section of the transit tube is entered into the coupling, the latter remains in place while the sections are driven in to complete the joint.

I do not limit myself to the arrangement and construction shown, as the same may be varied without departing from the spirit of my invention.

Having thus described the nature of my invention and set forth a construction embodying the same, what I claim as new and desire to secure by Letters Patent of the United States, is:

1. In a pneumatic despatch tube, the combination of a pair of tube sections disposed with alining ends, a splicing sleeve or union comprising a section of tube slidably fitting the ends of said tube sections, and means for securing the union comprising a clamp having means for tensioning the same about the tube, said clamp being longer than said union and having a portion of its inner surface between its ends inset to receive the same.

2. In a pneumatic despatch tube, the combination of a pair of alined tube sections, a section of tubing B' interposed between said sections in contact and alined therewith, a splicing sleeve or union comprising a section of tube slidably fitting the tube sections extending over the opposed ends of the same and inclosing said section B', and means for securing the union comprising a clamp having means for tensioning the same about the tube, said clamp being longer than said union and having a portion of its inner surface between its ends inset to receive the same.

3. In a pneumatic despatch tube the combination of a pair of alining tube sections, splicing means extending across the joint between the same and forming a cylindrical incasement thereabout slidable on the tube sections, and means for securing said splicing means including a sheet metal clamp having means for tensioning the same about the tube, said clamp being longer than the splicing means and having an offset portion between its ends to receive the same.

In testimony whereof, I have signed my name to this specification in the presence of two subscribing witnesses, this 4th day of November A. D. 1914.

JAMES G. MACLAREN.

Witnesses:
ELSIE MACLAREN,
EMMET D. GAUNT.

Copies of this patent may be obtained for five cents each, by addressing the "Commissioner of Patents. Washington, D. C."